July 20, 1965 E. KELLER 3,196,203
SEMICONDUCTOR DEVICE WITH STRESS RESISTANT SUPPORT FOR SEMICONDUCTOR DISC
Filed March 22, 1963
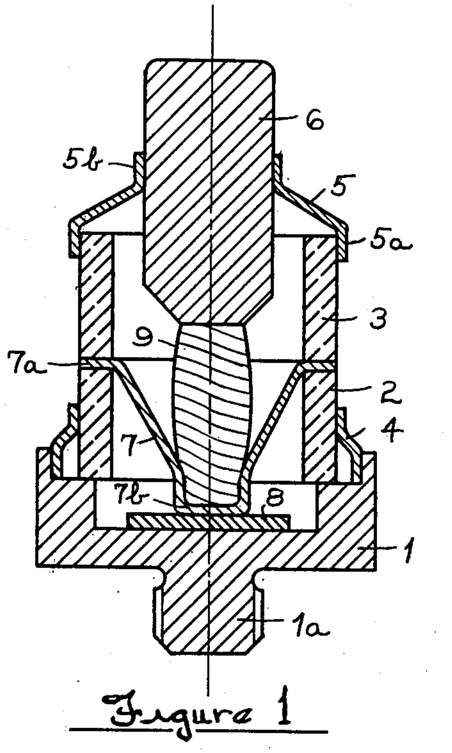
Figura 1
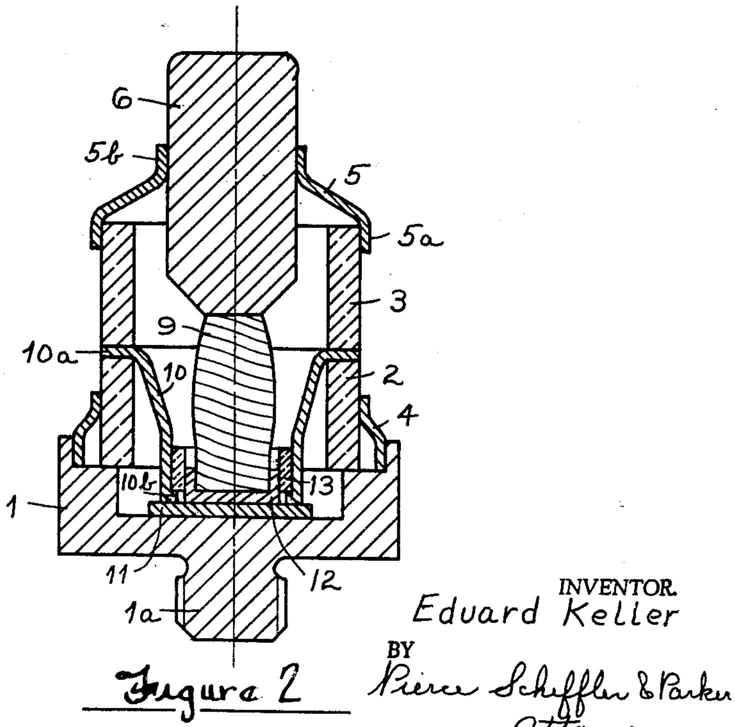
Figura 2
INVENTOR.
Eduard Keller
BY
Pierce Schiffler & Parker
Attorneys

1

3,196,203

SEMICONDUCTOR DEVICE WITH STRESS RESISTANT SUPPORT FOR SEMICONDUCTOR DISC

Eduard Keller, Wettingen, Switzerland, assignor to Aktiengesellschaft Brown, Boveri & Cie., Baden, Switzerland, a joint-stock company Filed Mar. 22, 1963, Ser. No. 267,229
Claims priority, application Switzerland, Mar. 23, 1962, 3,476/62
6 Claims. (Cl. 174—52)

This invention relates to semiconductor arrangements and is more particularly directed to an improved construction for such semiconductors which are enclosed within a casing.

For sealing these casings against introduction of the surrounding air it is usual to employ a metal-to-glass seal and the preferred metal for the sealed joint is one which has substantially the same coefficient of expansion as the glass. One such metal is marketed under the trademark "Kovar."

Due to the use of glass, however, the mechanical strength of such semiconductor casings is in many cases inadequate. This is particularly so when the semiconductors are subjected to large axial and radial acceleration forces, and especially sudden impacts. In order to avoid such difficulties, the present invention makes use of a seal which involves a combination of metal and ceramic, i.e. a metal-to-ceramic seal. This enables a much higher degree of safety to be achieved when high order mechanical stresses occur. With the metal-to-glass seals hitherto used, where long, stepped metal elements are present, fluctuating or even permanent displacements or distortions occur in conjunction with the connecting pin which leads into the semiconductor element. The usual braided copper connection which serves as an intermediate link in the electrical and mechanical connections is not always capable of preventing the semiconductor element, usually in disc form, from being damaged. In the case of "triode" type semiconductor arrangements having a control electrode, conditions are even more unfavorable due to the fact that the control electrode must also pass through the casing to reach the semiconductor element.

The improved enclosed semiconductor element construction in accordance with the invention features a novel and advantageous casing structure employing a metal-to-ceramic seal which may be used for semiconductor elements with control electrodes and also for semiconductor elements which do not employ a control electrode.

In accordance with the invention, the casing itself, which is made of metal, is provided with two coaxial ceramic tubes to which, as a closing element, a sleeve for fixing the connecting pin is soldered, and located within these ceramic tubes is a funnel-shaped sleeve that is soldered on, the bottom, tapered end of the funnel-shaped sleeve being provided with a plate-like surface in abutment with the semiconductor element.

The invention will now be explained with reference to a typical example of construction and the accompanying drawings wherein:

FIG. 1 is a view in vertical axial section of one embodiment of the invention which does not employ a control electrode for the semiconductor element; and FIG. 2 is also a view in vertical axial section of a second embodiment of the invention which does employ such a control electrode.

With reference now to the drawings, and to FIG. 1 in particular, the semiconductor arrangement includes a metal casing part 1, usually cylindrical, which is provided with a threaded stud 1*a* to enable the complete semiconductor assembly to be screwed into a support structure,

2 not illustrated, and which is usually provided with cooling fins or the like for conducting away the heat which is generated in the semiconductor during operation. Two ceramic tubes 2 and 3 arranged coaxially in superposed relation on the casing part 1 are soldered to the latter by means of a short axial length metal sleeve 4 surrounding the lower end of tube 2. Sleeve 4 can be made of "Kovar." Another sleeve 5 of metal also made from "Kovar" extends upwardly from the upper ceramic sleeve 3 and is soldered to the latter by means of flange portion 5*a*. The sleeve 5 is preferably tapered inwardly from the flange portion 5*a* to achieve good mechanical stability, and a connecting pin 6 passes through the sleeve 5 and is soldered to an upper flange portion 5*b* thereof.

A funnel-shaped metal member 7, which can be made of the same material as sleeve 5, includes an upper peripheral flange 7*a* which is secured between and soldered to the confronting ends of the ceramic tubes 2, 3. The lower, converging wall of member 7 terminates in a flat bottom plate 7*b*, and the lower face of this plate rests upon the semiconductor disc element 8, and is preferably soldered to the same in order to obtain a good current conductivity characteristic. Located within the member 7 is a braided copper conductor 9, the upper end of which is electrically connected with the pin 6, and the lower end of which is received into a well formed at the lower end of member 7 and electrically connected to the upper face of the bottom plate 7*b* by soldering, or by pressing, or by a combination of both methods.

The funnel-shaped member 7 provides a stable joint between the ceramic parts 2, 3 of the overall casing structure, and the connection to the semiconductor element 8. An advantage of member 7 is that it can be produced by punching or by pressing in a high precision operation. This enables the ceramic tube 2 to be constructed in such a manner as to its height that a predetermined pressure is exerted by member 7 on the semiconductor element, this being due to the mechanical stressed condition imposed upon member 7, which applies the pressure to the semiconductor element 8, as it is secured in place between the ceramic tubes 2, 3.

A slightly different construction is illustrated in FIG. 2 which is designed particularly for use with semiconductor arrangements having a control electrode. Those elements in the FIG. 2 which correspond to similar elements shown in the FIG. 1 construction have been assigned the same reference number. The principal difference is in the construction of the funnel-shaped member which applies pressure to the semiconductor element. Here the funnel-shaped metal member 10 is provided, as before, with an upper flange 10*a* secured in place between the adjoining ends of the ceramic tubes 2, 3 but the lower end does not terminate in a closure plate but rather terminates in an inwardly turned peripheral flange 10*b* which abuts the outer portion of the upper face of the circular semiconductor element 11. An electrical control lead to the controllable semiconductor element 11 is thus established. Electrical connection to that part of the semiconductor element located within the funnel-shaped member 10 is by way of the braided copper conductor 9 which on its lower end face is provided with a cap 12 which engages the upper face of the semiconductor element 11. Cap 12 is, of course, spaced radially from the flange 10*b*, and a ceramic bushing 13 located intermediate the axially extending part of the outer wall of cap 12 and the axially extending part of the inner wall of member 10 serves to maintain the member 10 and cap 12 in the proper radially spaced relation. Ceramic bushing 13 is joined to the cap 12 and member 10 by soldering.

In conclusion, the funnel-shaped member enables tension and pressure stresses to be absorbed which result from centrifugal force and impacts. The acceleration forces due to the mass of the heavy copper braid are restrained so that the semiconductor cell is not affected by them.

It is to be noted that the parts 2, 3 can for example be an aluminum-oxide ceramic material. The "Kovar" elements used in connection with the described structures consist of a metal alloy having the same thermal coefficient of expansion as glass and consisting of Fe 28%, Ni 18% and Co 54%.

I claim:

1. In an enclosed semiconductor arrangement the combination comprising a metal casing part, upper and lower ceramic tubes arranged in superposed concentric relation on said metal casing part, an elongated conductive connecting member extending through the interior of said ceramic tubes, an upper metal sleeve surrounding said connecting member, said upper sleeve being soldered peripherally to the upper ceramic tube and connecting member to form a sealed joint closing off the upper end of the upper ceramic tube, a lower sleeve peripherally soldered to said metal casing part and the lower end of said lower ceramic tube, a semiconductor element supported on said metal casing part and a funnel-shaped metal member having an upper peripheral flange secured between the confronting end walls of said superposed ceramic tubes, the lower portion of said funnel-shaped member terminating in a flat surface in abutment with said semiconductor element.

2. An enclosed semiconductor arrangement as defined in claim 1 wherein said funnel-shaped member is prestressed mechanically when secured in position and thus exerts a predetermined pressure on said semiconductor element.

3. An enclosed semiconductor arrangement as defined in claim 1 wherein the lower portion of said funnel-shaped member terminates in a cap in abutment with said semiconductor element, said cap receiving the lower end of a braided conductor element forming a part of said elongated conductive connecting member.

4. An enclosed semiconductor arrangement as defined in claim 1 wherein the lower portion of said funnel-shaped member terminates in an inturned flanged part constituting said flat surface in abutment with said semiconductor element and serves as a control lead to the latter, and the lower end portion of said elongated conductive connecting member terminates in a braided conductor element electrically connected to a part of said semiconductor element located radially inward of the surface part which abuts said inturned flanged part.

5. An enclosed semiconductor arrangement as defined in claim 4 and which further includes a ceramic bushing maintaining said braided conductor part and the lower portion of said funnel-shaped member in radial spaced relation.

6. An enclosed semiconductor arrangement as defined in claim 5 which further includes a bottom metal cap member at the lower end of said braided conductor part and wherein said ceramic bushing is located intermediate said cap member and the lower portion of said funnel-shaped member.

References Cited by the Examiner

UNITED STATES PATENTS

| | | | |
|---|---|---|---|
| 2,489,872 | 11/49 | Elder et al. | 174—50.56 X |
| 2,933,662 | 4/60 | Boyer et al. | 317—234 |
| 2,992,372 | 7/61 | Himeon et al. | 317—234 |
| 3,030,557 | 4/62 | Dermit | 317—234 |
| 3,030,558 | 4/62 | Berg et al. | 317—234 |
| 3,068,382 | 12/62 | Wagner | 317—234 |

FOREIGN PATENTS

| | | |
|---|---|---|
| 847,179 | 9/60 | Great Britain. |
| 1,261,798 | 4/61 | France. |
| 100,914 | 11/61 | Holland. |

LARAMIE E. ASKIN, *Primary Examiner.*

JOHN P. WILDMAN, *Examiner.*